US006011954A

United States Patent [19]

Krøll

[11] Patent Number: 6,011,954

[45] **Date of Patent: *Jan. 4, 2000**

[54] TRANSMITTING UPDATED INFORMATION

[75] Inventor: Bo Krøll, Frederiksberg, Denmark

[73] Assignee: IFX Scandinavia, Copenhagen K, Denmark

[ * ] Notice: This patent issued on a continued prosecution application filed under 37 CFR 1.53(d), and is subject to the twenty year patent term provisions of 35 U.S.C. 154(a)(2).

[21] Appl. No.: 08/652,532

[22] PCT Filed: Dec. 2, 1994

[86] PCT No.: PCT/DK94/00453

§ 371 Date: Jan. 8, 1997

§ 102(e) Date: Jan. 8, 1997

[87] PCT Pub. No.: WO95/15545

PCT Pub. Date: Jun. 8, 1995

[51] Int. Cl.[7] .......... H04B 7/00

[52] U.S. Cl. .......... 455/38.4; 455/566; 455/38.3; 340/825.44; 340/311.1

[58] Field of Search .......... 455/31.2, 31.3, 455/37.1, 38.1, 38.4, 66, 566, 186.1; 340/311.1, 825.44; 370/310, 313, 314

[56] References Cited

U.S. PATENT DOCUMENTS 5,087,905 2/1992 Kuramatsu et al. .......... 340/311.1
5,173,688 12/1992 DeLuca et al. .......... 340/311.1
5,396,228 3/1995 Garahi .......... 340/311.1

FOREIGN PATENT DOCUMENTS 0 404 007 12/1990 European Pat. Off. .
0 509 781 10/1992 European Pat. Off. .
0 536 831 4/1993 European Pat. Off. .

*Primary Examiner*—Reinhard J. Eisenzopf
*Assistant Examiner*—Lester G. Kincaid
*Attorney, Agent, or Firm*—Jacobson, Price, Holman & Stern, PLLC

[57] ABSTRACT

In a method of transmitting data from a transmitter to one or more receivers, e.g., pagers, data are transmitted in the form of a row of characters which may be received, stored and displayed in the receiver. The transmitted characters may constitute positions in a database. A line where just some positions are to be updated is divided into a left part just including positions which are not to be changed, and a right part including at least the positions which are to be changed. Only positions in the right part are transferred to the receiver, and this takes place in sequence from the right to the left, while the positions in the left part are maintained unchanged. A second type character may additionally be transmitted, as needed, containing bits which may be combined with the succeeding characters such that these are caused to virtually contain a larger number of bits than the transmitted one.

11 Claims, 4 Drawing Sheets

| | | |
|---|---|---|
| ASTRA | 1305 | 168/9 |
| ATCOB | 1306 | 395/7 |
| ELUXB | 1305 | 255/6 |
| LMEB | 1304 | 354/6 |

FIG. 8A

| | |
|---|---|
| USD:DEM | 1.6050/55 |
| USD:JPY | 103.10/15 |
| UKL:USD | 1.4510/20 |
| USD:DDK | 7.0770/75 |

FIG. 8B

| | |
|---|---|
| USD:DEM | 1.6060/65 |
| USD:JPY | 103.20/25 |
| UKL:USD | 1.4505/15 |
| USD:DDK | 7.0750/70 |

FIG. 8C

| | |
|---|---|
| USD:DEM | 1.5980/95 |
| USD:JPY | 103.12/17 |
| UKL:USD | 1.4485/95 |
| USD:DDK | 7.0775/70 |

TRANSMITTING UPDATED INFORMATION

BACKGROUND OF THE INVENTION

The invention concerns a method of transmitting data from a transmitter to one or more receivers, said data being transmitted in the form of a row of characters. These may be received, stored and displayed in the receiver or in each receiver, and the transmitted characters constitute positions in a database. The positions are divided into lines so that the positions in each line are sequenced from the left to the right.

Public paging system are well-known and have found widespread use. The operation of these systems is that information is broad cast from a transmitter by means of radio waves, and that this information may be received by a large number of pagers. Each pager is provided with its own individual address, and when it is desired to transmit information from the transmitter to a specific pager, a combination of the address of said pager and the information concerned is transmitted. Only the pager having the proper address is then capable of receiving the information. Thus, all pagers currently monitor whether their address is transmitted, and when a given pager receives its address, it is activated and receives the subsequent information. This information may then be stored in the pager and be indicated for the person concerned.

In a simple embodiment, the pager merely amits a sound or light signal pointing out to the person that someone wants to get in contact with the person. In another embodiment, numeric information is transmitted to the pager. This typically a telephone number which the person concerned is requested to call. There are also pagers which are capable of receiving alphanumeric information so that short messages may be transmitted to the person carrying the pager.

It is also known to transmit the same information to several pagers at the same time. This is used e.g. when it is desired to transmit the contents of databases to a plurality of receivers. Examples are flight departures, price lists, sports scores or financial information, such as e. g. stock lists. In this case, a large number of pagers are provided with the same address so that the information broadcast to this address will be received by all these pagers. The pagers concerned are normally also provided with an individual address, as described above, so that individual information may be received as well. U.S. Pat. No. 5,241,305 discloses e.g. a system in which information is transmitted simultaneously to several receivers in this manner. This system is unique in that the address which is common to several receivers may be transmitted from the transmitter. Thus, it is possible at a given time to authorize a plurality of pagers to receive a subsequent items of information. Each pager is thus capable of storing a plurality of addresses which may be changed currently at the transmitter side. This provides a very flexible system, in which e.g. a given receiver way be deleted from the database if the person concerned has not paid for the ability to receive the information concerned, and new receivers may correspondingly be added in a simple manner when they take out a subscription for the database concerned.

In connection with other forms of transmission of data, it is well-known to compress these data in order to increase the capacity of the transmission channel in this manner. However, some transmission systems have a very "rigid" protocol which has previously made it difficult to compress data which are transmitted via these channels.

This is the case e.g. for the mentioned paging systems. Here, a protocol called POCSAG (post office code standard agreement) is typically used. A proposal for compression of data which are transmitted to a plurality of pagers by means of this protocol, is known from the above-mentioned U.S. Pat. No. 5,241,305. The method disclosed by this document is based on the fact that in many databases, such as e.g. sports scores, a large amount of the information of the database will be unchanged for a long period of time, while other items of information are changed frequently. Therefore, the positions of the database are divided into two groups, one group for data which are rarely changed, and another group for data which are frequently changed. When the database is transmitted to a receiver for the first time, both groups are transmitted, but in subsequent updates of the database, e.g. when new sports scores are available, it is just necessary to transmit the group of data in which the changes occur most frequently. However, this division into two groups is permanent, and when e.g. a single character is to be changed, it is thus still necessary to transmit all the positions arranged in the group in which changes may frequently occur. Although this method thus provides a certain compression, the method is thus far from optimum, since a considerable amount of superfluous information is still transmitted.

A similar system is known from European patent application EP-A-0 404 007. This system also suffers from the mentioned drawbacks.

It is also known to compress data in another connection by omitting redundant information. Thus, U.S. Pat. No. 4,682,150 discloses a method wherein data to be stored in a storage device are compressed by just storing data that vary between each individual data record. However, this general principle is not directly applicable in connection with transmission of data by means of the above-mentioned POCSAC protocol.

Another method for compression for data in databases to be stored is known from U.S. Pat. No. 4,701,744. Here, a control character is used for switching between two character sets. The drawback of this method is that switching can only be between two specific sets of characters. Thus, the function of the control character is merely to switch from one set of characters to the other, and it does not contribute to the actual compression. Finally, International Patent Application No. WO 92/10035 discloses a datacommunications system in which data prior to transmission are converted into a suitable number system, thereby improving the utilization of the characters available. Here a number system with base 85 is used, because this is precisely the number of options provided by the protocol concerned. Similarly, the POCSAG protocol provides the possibility of using a number system with base 87. However, both of these number systems with base 85 and 87, respectively, are inconvenient in normal use, since they require relatively great allocations of CPU time for decoding on the receiver.

Finally, the European patent application EP 536 831 discloses a corresponding transmission system capable of changing between two transmission modes by means of a control character. In one mode, transmission takes place entirely according to the POCSAG protocol, while in the other mode the address of a text string already stored in a ROM storage in the receiver may be transmitted. Here, too, the control character is thus just used to change between two positions.

BRIEF SUMMARY OF THE INVENTION

The invention provides a method of the type mentioned in the opening paragraph, which makes it possible to obtain a considerable compression of the transferred data in connection with transmission e.g. by means of the mentioned POCSAG protocol. The method is a 100% transparent higher order protocol, which means that it is compatible with all existing hardware and software at the operator who operates an existing paging system. Thus, no transmitter intervention is necessary for the method to be employed. on the contrary, it may be implemented merely by adapting the individual receivers such that they can decode the information. The CPU time requirement for decoding and subsequent processing in the receiver is minimal.

This is achieved according to the invention by dividing a line to be updated in which not all the positions of the line are to be changed, into two parts, a first part and a second part. The first part just comprises positions which are not to be changed, and the second part comprises at least the positions which are to be changed. Characters are just transferred from the second part to the receiver. The positions in the first part are maintained unchanged in the receiver.

By transmitting only the characters in the second part of the line, a considerable compression is obtained, since it applies to databases of this type, i.e. e.g. sports scores or stock quotations, that the least significant characters, i.e. often the characters farthest to the right, are changed most frequently. This means that the farther to the left a character is, the rarer a change takes place, and it is therefore optimal just to transmit the characters which are to be changed. Thus, it will frequently suffice to transmit a single character.

By transmitting the characters of the second or right part in sequence from the right to the left a favourable solution is obtained in that the transmission starts from the right and is continued only until all changed characters have been transmitted.

In another embodiment, precisely just the characters which have been changed or are situated between two changed ones, are transmitted. This provides optimal compression. The embodiment described in claim 4 includes an additional plurality of the next, i.e. redundant, characters in the same line. This provides the possibility of regulating the degree of redundancy, which may be desirable in radial transmission owing to expected data losses.

The invention includes a method wherein the transmitted characters are called a first type and consist of a given number of bits. A further character of a second type is transmitted, as needed, and is received and stored together with the characters of the first type. The characters of the second type contain bits which are then combined with one or more characters of the first type in such a manner that these characters are extended to contain a larger number of bits than the number of bits transmitted for the characters concerned. When a character of the second type is used in this manner as a control character containing bits which are used for virtually increasing the bit number of the other characters, i.e. the characters of the first type, as needed, a very considerable compression is obtained, since the optimal character set may be chosen for each character. Where the POCSAG protocol, as mentioned above, e.g. provides the possibility of using a character set with base 87 alone, it will thus possible, as needed, to add an additional bit to the character concerned and thus e.g. use a character set with base 100. An item of information which would normally require transmission of two characters, may thus be transferred by means of merely a single character and an additional bit in the control character. A single control character may contain several bits and thereby be able to increase the bit number for several characters, which provides a correspondingly great compression.

A further increase in the compression in achieved by allocating additional bits from the control character only to the characters whose information contents makes it necessary. When, as stated in claim 8, precisely one bit is used for each of the characters where this is needed, a control character can cover the greatest possible number of characters.

When the said control characters, i.e. the characters of the second type, are allowed to contain one or more bits which define the character as a character of the second type, the CPU time required in the receiver is reduced.

Further the control character may comprise a plurality of bits which constitute an independent character. This ensures that characters which may be transferred with a small number of bits—it may be e.g. a sign such as plus, minus, oblique stroke or the like—may be transferred completely without using one of the characters of the first type, which results in a further increase in the compression.

The said control characters or characters of the second type may be combined several at a time (cascade coupling), which means that several characters of this type are transmitted immediately in succession. This has the result that very long subsequent data strings may be controlled and optimized.

BRIEF DESCRIPTION OF THE DRAWINGS

The invention will be explained more fully below with reference to the drawings, in which FIGS. 8A–C show examples of how information in a pager may be updated.

DETAILED DESCRIPTION OF THE INVENTION

Figures 1, 2:
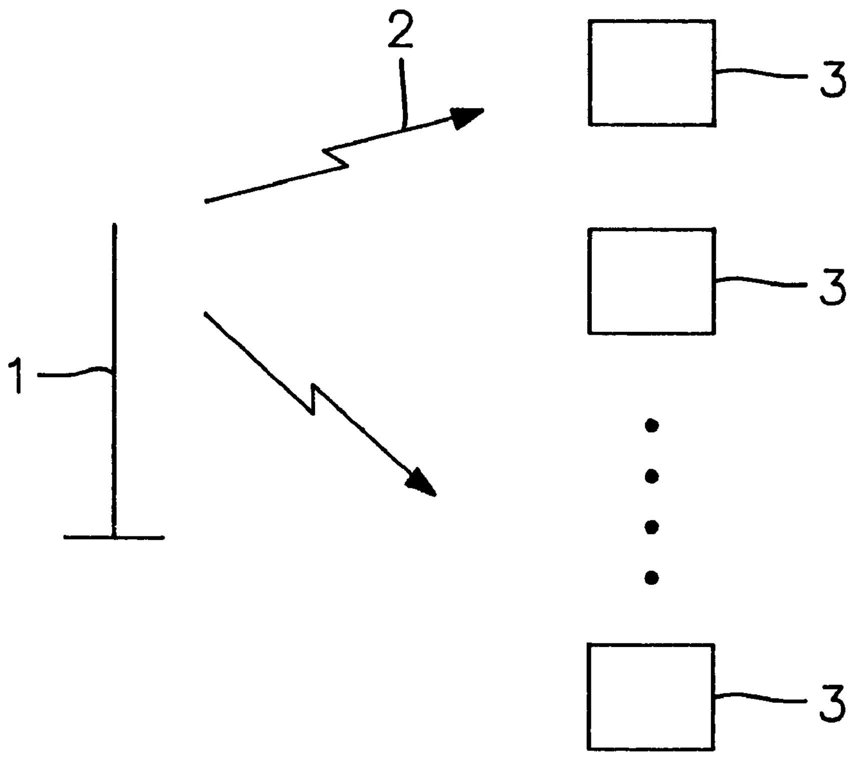
FIG. 1 is a schematic sketch of a paging system in which the invention may be used.
FIG. 2 shows an example of information which may be displayed on a pager.

FIG. 1 shows in outline how a paging system may be designed. The system comprises a transmitter aerial which transmits radio waves 2. These radio waves are received by a plurality of pagers 3, each of which has a circuit for receiving, storing and displaying information. Each pager has its own address, and it is activated when this address is transmitted from the transmitter aerial 1. Only the pager 3 which has th correct address, can receive the information which is transmitted in continuation of this address. Simple pagers merely emit a light or sound signal when they have received the information, while other more sophisticated types can display received information either in numeric form or in alphanumeric form. The latter type of pagers thus lend themselves for transmitting e.g. information from databases. In this situation it is frequently expedient that a plurality of pagers have a common address so that all of them can receive information transmitted on this address.

Thus, the database information concerned just has to be transmitted once from the transmitter, even though it is to be received by a large number of pagers. The pagers having a common address frequently also have an individual address so as to enable them to receive individual information.

FIG. 2 shows an example of the information that can be displayed on the display of a pager when information is transmitted from e.g. financial databases. Such information may e.g. be stock information or exchange rates. Of course, the same system may be applied for databases of sports scores, flight departures, price lists or other corresponding information.

Figure 3:
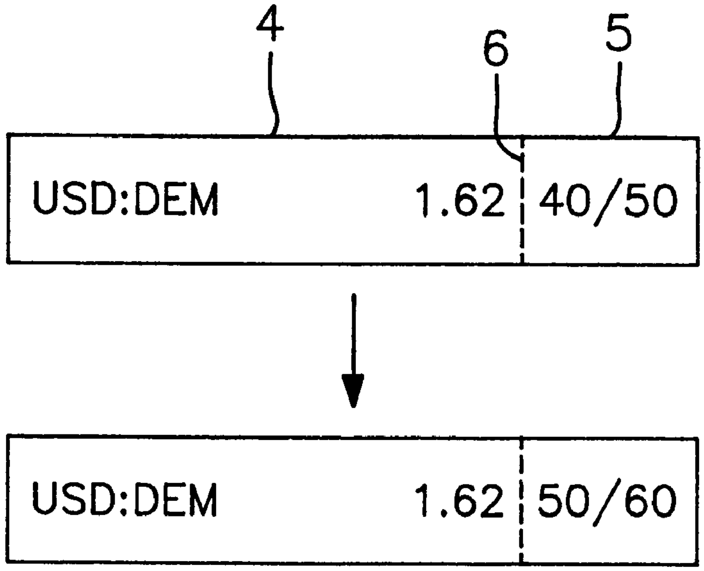
FIG. 3 shows an example of a change of a line according to the invention.

A common feature to information of this type is that the further a character is situated to the right in a given line, the more freguently it is updated. The upper part of FIG. 3 shows an example of a line from a database which contains exchange rates. The exchange rate involved is indicated farthest to the left, in this case USD:DEM. This part of the information of the line is updated only if it is desired to delete the exchange rate concerned completely from the database and to add another instead. The actual rate is given to the right in the line, and it applies here too that the least significant digits, i.e. the digits farthest to the right, will be updated most frequently. FIG. 3 shows the case where the rate concerned is updated from 1.6240/50 to 1.6250/60. In a normal paging system, which typically employs the so-called POCSAG protocol, the characters in such a line are transmitted in sequence from the left to the right in the update and all the characters of the line are transferred in the update. In the figure, the contents of the line are divided into a left part 4 and a right part 5, and the border between the two lines is indicated by the dotted line 6. The left part 4 contains the characters which are not affected by the change, while the right part 5 contains the changed characters. In the invention, only the right part 5 of the line is transferred, while the left part 4 is maintained unchanged in the pager, and the characters in the right part 5 are transferred in sequence from the right to the left. Thus, starting from the right and transmitting characters only until all changed characters have been transmitted, ensure the greatest possible compression. The part of the protocol implemented by the database supplier thus checks in sequence from the right to the left which characters are to be updated, and then transmits these in the same sequence. The pagers concerned receive this information in the same sequence and update the characters concerned, while the rest of the line is left unchanged.

This division of the line into a right part and a left part can thus take place for each line independent of the other lines, and it is sufficient to transmit the lines where changes have actually taken place. If desired, it is of course possible to transmit whole lines or whole pages, like in the prior art, and current switching between transmission of lines and transmission of pages is possible.

Figure 4:
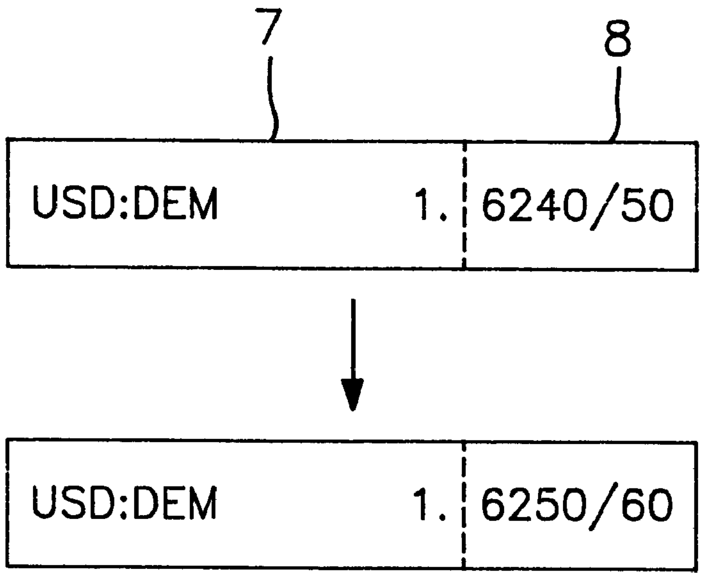
FIG. 4 shows another example of a change of a line according to the invention.

If desired, the protocol my also be sat to receive a given number of the next (redundant) characters in the line which are updated. FIG. 4 shows the same example as FIG. 3, in which the exchange rate concerned is changed from 1.6240/50 to 1.6250/60. Here, however, the right part 8 has been extended to comprise the digits 62 as well although these are not changed in the update. The left part 7 becomes correspondingly smaller. The degree of redundancy say be changed in this manner, as needed, and this may even take place line by line in a given database. This may often be desirable particularly in digital radio transmission, since a certain data loss may be expected in case of 100% non-redundant transmission.

It should be noted that the part of the transmission path which extends from the transmitter to the individual receivers, i.e. the part which is typically handled by a public service, continues to operate according to the mentioned POCSAG protocol. The transmission merely includes fewer characters than would normally have been the case. To make this principle work, changes thus have to be made only at the actual database supplier and in the individual pager. There is no intervention in the part of the transmission which is handled by the public service.

The flow of characters transmitted by means of the POCSAG protocol typically contain characters of 7 bits each. Each character therefore represents 128 ($2^7$) permutations, which means that each character can assume 128 different values. It will therefore be evident to use a number system with base 100, since.g. the number “50” from the example in FIGS. 3 and 4 may be written by means of just one character. However, the POCSAG protocol has reserved a number of the 128 possibilities for internal purposes. The permutations reserved may amount to 30–50, and since there will thus not be 100 possibilities for transfer of information, a representation with bases 100 is no longer possible. Typically, one is left with base 87, which cannot be used expediently, since this would require great allocation of CPU time for decoding in the receivers. It would therefore be expedient if the individual characters contained more than 7 bits. The invention allows the individual characters to virtually have more bits.

This is done by regularly inserting an extra character called a control character or second type character into the data flow. By means of this character, a variable number of subsequent characters may be redefined independently or batchwise as belonging to another and more expedient character set. The control character contains a plurality of bits which may each be considered as constituting and eighth bit for some of the subsequent characters, so that these may assume a larger number of values. Addition of such an “eighth” bit thus makes it possible to use the number system with bass 100. If a further bit is added to each character, also other number systms, e.g. with base 1000, are conceivable of course.

For a given control character, the algorithm analyses the next-following characters (i.e. the characters before the next control character) at the transmitter side, i.e. at the databese supplier, and then allocates the most expedient character set or sets to these. Where necessary, one or more additional bits are then allocated to the subsequent characters. These additional bits are placed in the control character, and both this and the subsequent information characters are transmitted from the transmitter to the receiver as ordinary 7 bit characters in accordance with the POCSAG protocol. However, these bits are interpreted in the receivers together with the subsequent characters, which thereby apparently consist of a larger number of bits.

It should be noted that since the characters concerned are stored in the individual receivers, it is unimportant whether a control character is transmitted before or after the information characters together with which it is to be interpreted. Thus, a control character may therefore contain bits which are to be interpreted together with other preceding or subsequent information characters.

Figure 5:
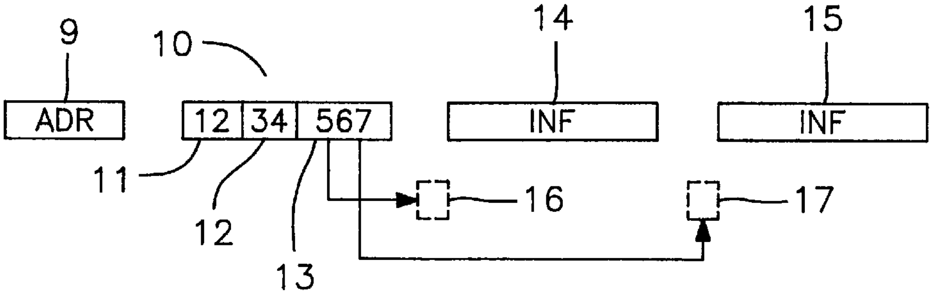
FIGS. 5 and 5A show the use of a control character according to the invention.

FIG. 5 shows an example of a plurality of characters transmitted to a plurality of pagers. The transmission comprises an address character 9, a control character 10 and the two information characters 14, 15. The address character 9 is the character ensuring that it is the proper pagers which receive the information. The control character 10 is divided into three parts. The first part 11, which comprises bits 1–2 is used for defining the character as a control character. The second part 12 comprising bits 3–4 is employed for a so-called delimiter, which is described more fully below. The third part 13 comprising bits 5–7 is employed as described above, for "extending" the subsequent characters 14, 15. It appears that bit 6 from the control character 10 is extracted as an independent bit 16, which may then be interpreted together with the information characters 14, which will thus contain 8 bits. Similarly, bit 7 is interpreted as an independent bit 17, which extends the information character 15 to 8 bits.

Figure 5A:
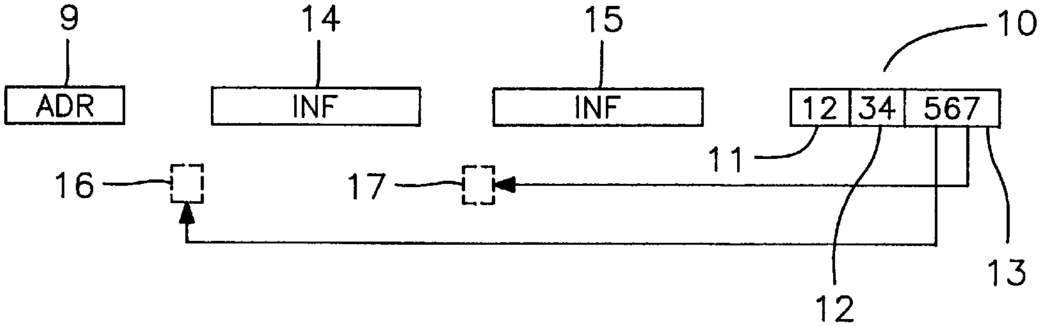

As mentioned above, the control character can also be transmitted after the information characters. This is shown in FIG. 5A.

Certain characters may be written with a very small character set. This applies to e.g. so-called delimiters, such e.g. "/", "+", "–" and "none". In this case with just four different possibilities, two bits suffice, and it is thus possible to transfer a whole character by using e.g. two bits in the control character. In this case, the part 12 of the control character 10, i.e. bits 3–4, is used for this purpose. This enables additional compression. In the example, bit 5 in the control character 10 is not used. It could thus be possible to extend a further subsequent information character with an additional bit or one of the characters 14, 15 might have been extended with two additional bits.

The transmission in FIG. 5 might e.g. be used for transferring the update of a database which is shown in FIG. 3 in which an exchange rate is changed from 1.6240/50 to 1.6250/60. Since each of the characters 14, 15 now virtually contains 8 bits, the number system with base 100 may be used, and the character 14 may thus transfer "60", and the character 15 may transfer "50". It should be noted that the characters are transferred in sequence from the right to the left. The character "/" is transferred as a delimiter, i.e. by means of bits 3–4 in the control character 10. It is thus possible to transfer this entire update by means of just three 7-bit characters according to the POCSAG protocol, viz. the control character 10 followed by the information characters 14, 15.

Figure 6:
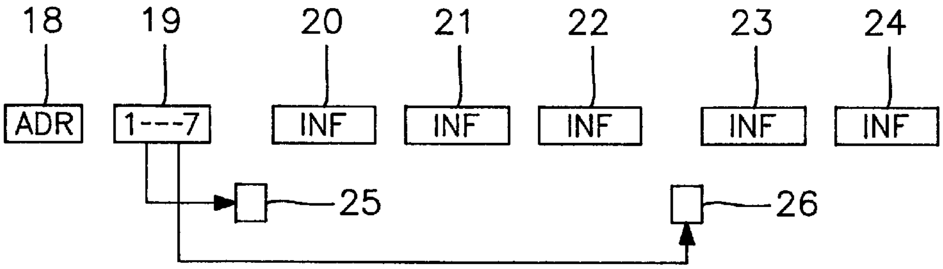
FIG. 6 shows an example where not all characters are combined with bits from the control character.

Correspondingly, FIG. 6 shows an example where not all the subsequent information characters need to be allocated an additional bit. In this case, the address character 18 is transmitted, followed by the control character 19 and the information characters 20, 21, 22, 23 and 24. The information characters 21, 22 and 24 contain information which may be described sufficiently by means of seven bits. Bits 6 and 7 in the control character 19 are therefore used as independent bits 25, 26 which are used in combination with the information characters 20 and 23, as these contain information which is best described by means of 8 bits. Otherwise, the mode of operation is the same as described e.g. in connection with FIG. 5. When an additional bit from the control character is just used where needed, the compression is increased additionally.

Figure 7:
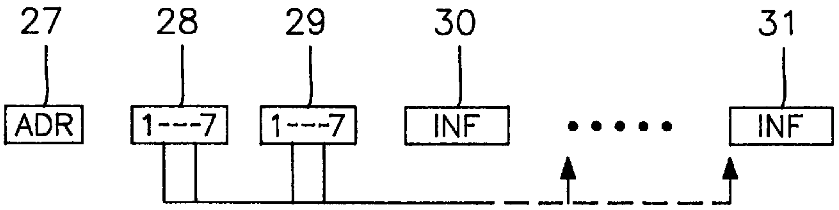
FIG. 7 shows a cascade coupling of two control characters.

FIG. 7 show n an example which employs two cascade-coupled control characters 28, 29, which means that the two characters are transmitted in direct continuation of each other. The additional bits in the two control characters are then used in combination with a large number of subsequent characters. Thus, in this example the address character 27 is followed by the control characters 28 and 29 and than a row of information characters beginning with the character 30 and ending with the character 31. Like the example in FIG. 6 the individual bits from the control characters, as also shown by arrows, may be combined with those of the subsequent characters where an additional bit is needed for the information to be transferred. Thus, character strings of a considerable length may be involved.

FIGS. 8A–C show two examples of how information in a pager may be updated. FIG. 8A shows the starting situation, i.e. the "old" rates. FIG. 8B shows an update of FIG. 8A. The changed values are shown in bold-faced type. A normal update according to the prior art in accordance with the POCSAG protocol requires transfer of eighty characters for performance of this update, since all the shown characters will be transferred. In the method of the invention, it is just necessary to transmit two main address characters followed by sixteen characters, a character having line coordinates, a control character as described above and two information characters, being transmitted for each of the four lines. Thus, each line corresponds to the situation illustrated in FIG. 5. The control character allocates an additional bit to each of the following characters, and these characters then have values in the number system with base 100. Further, the control character contains information which shows "/" like the delimiter described above.

In this case, i.e. the update shown in FIG. 8B, the left half of the field is thus not updated or is updated only rarely, and if an update is performed, this may take place from either the right or the left. The right half is updated from the right to the left. In each case, it is the control character that controls the writing direction of the following character string, and only characters which have changed, are transmitted. The digits are transmitted in pairs for each line, it being possible to use the number system with base 100 by means of the additional bit for each character, which means that each character represents the values 00–99.

In another example, the information from FIG. 8A is updated to the information shown in FIG. 8C. Here, too, the updated values are shown in bold-faced type. According to the prior art, eighty characters are to be used here, too, for transferring the updated information, while, in the novel method, only two main address characters are necessary, followed by another 21 characters. Here, too, the left half of the field is not updated or only rarely, and if an update is performed, this may take place from either the right or the left. The updated information is again written in a direction from the right to the left for the four lines. In this case, a control character is used in the transfer of line 2 and optionally line 4, the characters in these lines being thus transferable in the number system with base 100. The use of the control character is thus very flexible and is adapted to the requirement which each individual line has.

Examples are described in the foregoing of how a method of the invention may be implemented, and it will appreciated that details may be modified in many ways within the scope of the invention. Thus, e.g. characters having other bit numbers than the mentioned ones may be used, and the method my conceivably be used to the same advantage in connection with other protocols than the mentioned POCSAG protocol.

I claim:

1. A method of transmitting data from a transmitter to one or more receivers, said data being transmitted in the form of a row of characters which may be received, stored and displayed in the receiver or each receiver, said transmitted characters constituting positions in a database, said positions being divided into lines, said positions in each line being sequenced, and wherein said positions may be refreshed in such a way that some positions are changed while others remain unchanged, and wherein at least some of the unchanged positions are not transmitted to the receiver in the refreshing process, comprising the steps of:

adaptively dividing a line, each time said positions are to be refreshed, into a first part consisting of positions which are not to be changed this time, and a second part comprising at least the positions which are to be changed this time, such that the division depends on which positions are to be changed this time, transmitting to the receiver only characters constituting positions in the second part of the line, and maintaining in the receiver the positions in the first part unchanged.

2. A method according to claim 1, wherein the positions in the database correspond to positions on a display in the receiver, and wherein the first part of a line is called the left part and the second part of the line is called the right part, and that the characters constituting positions in the right part are transmitted in sequence from the right to the left.

3. A method according to claim 1, wherein the right part (5; 8) consists of positions which are to be changed, and positions which are situated to the right of one or more of these positions.

4. A method according to claim 1, wherein the right part (5; 8) moreover comprises positions which are situated to the left of all positions which are to be changed.

5. A method according to claim 1, wherein said characters are of a first type and consist of a given number of bits, characterized in that a second type (10) character is additionally transmitted, as needed, said character being received and stored in the receiver or each receiver together with the first type characters and containing bits which are then combined with one or more subsequent or preceding first type characters in such a manner that these first type characters are extended to contain a larger number of bits than the number of bits transmitted for the characters concerned.

6. A method according to claim 5, wherein only those of the succeeding or preceding characters (20, 23) whose information contents makes it necessary, are combined with one or more bits from said control character (10).

7. A method according to claim 5, wherein the bits combined with one or more succeeding or preceding first type characters are distributed with precisely one bit to each character.

8. A method according to claim 5, wherein said second type (10) character moreover comprise one or more bits (11) which define the character as a second type character.

9. A method according to claim 5, wherein said second type (10) character moreover comprises a number of bits which constitute an independent character (12).

10. A method according to claim 5, wherein plural second type characters (28, 29) are transmitted in direct succession.

11. A method of transmitting data from a transmitter (1) to one or more receivers (3), said data being transmitted in the form of a row of characters of a first type which each consist of a given number of bits, and which may be received, stored and displayed in the receiver or each receiver, and wherein a second type (10) character is additionally transmitted, as needed, said character being received and stored in the receiver or each receiver together with the first type characters, characterized in that said character of second type (10) contains bits which are then combined with one or more succeeding or preceding first type characters in such a manner that these first type characters are extended to contain a larger number of bits than the number of bits transmitted for the characters concerned.

* * * * *